No. 730,703.  Patented June 9, 1903.

UNITED STATES PATENT OFFICE.

ALEXANDER SYDNEY RAMAGE, OF CLEVELAND, OHIO.

PROCESS OF PRODUCING LACTOSE FROM WHEY.

SPECIFICATION forming part of Letters Patent No. 730,703, dated June 9, 1903.

Application filed January 27, 1902. Serial No. 91,419. (No specimens.)

*To all whom it may concern:*

Be it known that I, ALEXANDER SYDNEY RAMAGE, a citizen of the United States, residing at Cleveland, in the State of Ohio, have invented new and useful Improvements in Processes of Producing Lactose from Whey, of which the following is a specification.

This invention consists in a process of treating whey to recover therefrom the milk-sugar or lactose.

In carrying out the process clear whey is rendered slightly alkaline with any suitable agent—for example, lime-water or sodium carbonate. The whey is then concentrated by evaporation, preferably *in vacuo*, to about one-half its bulk. During such concentration a small amount of alum or other suitable reagent is added to precipitate the whey proteids, such as lactalbumin and lactoglobulin. The resulting precipitate is then removed by filtration. The clear filtrate is evaporated *in vacuo* to one-sixth its bulk, an equal volume of methyl alcohol added, and the mixture allowed to stand several hours. A pure-white finely-crystalline precipitate of lactose is thereby thrown down, which is removed by filtration and washed with alcohol. The filtrate and washings are afterward distilled to recover the alcohol.

I claim—

1. The process of producing lactose from whey, which consists in removing the whey proteids and then adding sufficient methyl alcohol to precipitate the lactose, as set forth.

2. The process of producing lactose from whey, which consists in removing the whey proteids, concentrating, and then adding sufficient methyl alcohol to precipitate the lactose, as set forth.

3. The process of producing lactose from whey, which consists in concentrating the whey, removing the whey proteids, again concentrating to a smaller volume and finally adding sufficient methyl alcohol to precipitate the lactose, as set forth.

4. The process of producing lactose from whey, which consists in concentrating the whey to about one-half its volume, removing the whey proteids, again concentrating to about one-sixth its volume, and finally adding sufficient alcohol to precipitate the lactose, as set forth.

5. The process of producing lactose from whey, which consists in rendering the whey slightly alkaline, removing the whey proteids, and finally adding sufficient methyl alcohol to precipitate the lactose, as set forth.

6. The process of producing lactose from whey, which consists in rendering the whey slightly alkaline, concentrating to about one-half its volume, removing the whey proteids, again concentrating to about one-sixth its volume, and finally adding sufficient alcohol to precipitate the lactose, as set forth.

In testimony whereof I affix my signature in presence of two witnesses.

ALEXANDER SYDNEY RAMAGE.

Witnesses:
A. E. GILBERT,
C. R. CARRUTH.